United States Patent Office 3,530,179
Patented Sept. 22, 1970

3,530,179
CONDENSATION PRODUCTS OF TETRACYCLINES CONTAINING SULFUR
Feriano Banci and Ezio Tubaro, Rome, Italy, assignors to Stabilimenti Chimico-Farmaceutici Dott. R. Ravasini & C.ia S.p.A., Rome, Italy, a corporation of Italy
No Drawing. Filed Dec. 30, 1966, Ser. No. 606,013
Claims priority, application Italy, Jan. 29, 1966, 1,877/66, 1,878/66; Nov. 26, 1966, 43140A/66
Int. Cl. C07c 103/19
U.S. Cl. 260—559                      1 Claim

ABSTRACT OF THE DISCLOSURE

Condensation products of tetracyclines containing sulfur are prepared by reacting together a tetracycline, formaldehyde and an amine containing a sulfuric acid radical having the formula $$R\text{—}NH\text{—}Z\text{—}SO_2X$$

wherein R is taken from the group consisting of hydrogen, alkyl and hydroxyalkyl radicals containing up to 4 carbon atoms, Z is taken from the group consisting of $CH_2$ and $CH_2\text{—}CH_2$, and X is taken from the group consisting of OH when Z is $CH_2$, H when Z is $CH_2\text{—}CH_2$ and SH when Z is $CH_2\text{—}CH_2$. The molar ratio of amine to tetracycline in the products is 1:2.

---

This application relates to novel and useful tetracycline derivatives having particular and uncommon properties, to a process for their preparation as well as to their employment in therapeutics.

It is known that tetracyclines react with formaldehyde and primary and secondary amines (J. Am. Chem. Soc. 81, 1198, 1959—German Pat. No. 1,044,806) and with formaldehyde and carboxylic aminoacids (Boll. Chem. Farmaceutico 100, 9, 1961—Belgian Pat. 597,187), and with sole formaldehyde (German Pat. 1,196,648) to give water soluble derivatives.

An object of the present invention is the production of novel condensation products of tetracyclines with formaldehyde and a particular type of amines containing a sulfurated acid function, such products being never before described and having revealed surprising pharmacological properties.

Another object of the invention is the improved process for the preparation of the novel products of the present invention.

A further object of the invention is the employment of the above mentioned products of condensation of tetracyclines, as components of pharmaceutical formulations, particularly as antibacterial drugs.

The compounds of the invention are reaction products of a tetracycline with formaldehyde and a particular type of amine having a sulfuric acid radical in its molecule and characterised by the following general formula:

$$R\text{—}NH\text{—}Z\text{—}SO_2X$$

wherein R can be hydrogen or alkyl or hydroxyalky with no more than 4 carbon atoms; Z is $CH_2$ or $CH_2\text{—}CH_2$; X is OH when Z is $CH_2$ or X is H or SH when Z is $CH_2\text{—}CH_2$.

Amines falling within this general formula are for example aminomethane sulfonic acid, methyl-aminomethane sulfonic acid, ethylaminomethane sulfonic acid, n-butylaminomethane sulfonic acid, β-hydroxy-ethylamino methane sulfonic acid, 1-amino-2-ethane sulfinic acid, 1-amino-2-ethane thiosulfonic acid, and others which can be obtained by varying the general formula within the previously defined limits.

When the above amines are reacted under suitable conditions with formaldehyde and a tetracycline, there are obtained the compounds which are the object of this invention.

As to the molecular composition of said products, it can be stated that elemental analysis (and, to this end, chiefly that of S is probative, S being the new characteristic element) indicates in there novel derivatives a molar ratio of amine to tetracycline of 1:2. The infrared spectrum indicates the presence of the band of a secondary amide, which would demonstrate that tetracycline is bound to the sulfurated-acid-function-containing amine through the carboxyamide group by means of a methylene bridge. Since the molar ratios 1:2 between amine and tetracycline exist with both the amines where R is H as well as those where R is an alkyl or hydroxyalkyl, this suggests that a molecule of tetracycline is bound to the amine as an aminomethyl-derivative and the second molecule of tetracycline has a different not yet definitely determined linkage.

The above constitutes our latest view on the intimate molecular constitution of the products of the invention, which had been previously provisionally briefly established on the basis of preliminary.

In any case, with regard to the structural aspect, we do not intend to bind ourselves with theoretical considerations, the important thing being chiefly the fact that by operating according to the process which is the object of this invention there are obtained products which have a definite and constant composition, for which the infrared spectrum shows always the above mentiond absorption and the elemental analyses vary merely within the limits of the experimental errors and indicate a molar ratio of amine to tetracycline of 1:2.

Tetracyclines particularly useful to the invention are: tetracycline, 7-chlorotetracycline, and 5-hydroxy-tetracycline; however, also 7-chloro-6-demethyl-tetracycline, and 6-demethyl-tetracycline, as well as their isomers, can be transformed according to the process of the invention.

In the reaction products, the sulfuric acid radical of the amine can be free or salified with sodium, potassium or an organic base, including antibiotics of a basic nature as kanamycin, streptomycin, and erythromycin; the products salified with sodium are preferred.

The novel derivatives are generally very water soluble and some of them show a high stability in solution, consequently they lend themselves very well to be taken orally as well as parenterally, since they are well absorbed regardless of the means of administration.

In the following tables there are indicated some properties of some preferred products of the invention; however, it is to be understood that we have conducted similar experiments with the other products which are the object of this invention, and we have obtained qualitatively, analogous, even if quantitatively different, results.

TABLE 1

Protection by mouth of Swiss white rats infected with Klebsiella pneumoniae. All $ED_{50}$ are expressed as mg. of chlorotetracycline hydrochloride, in order to allow a direct comparison.

| Product | $ED_{50}$ in mg./kg. |
|---|---|
| Chlorotetracycline hydrochloride | 55 |
| The reaction product between ethanolamino methane sulfonic acid, formaldehyde and chloro tetracycline according to this invention | 58 |
| The reaction product between 1-amino-2-ethane sulfinic acid, formaldehyde and chlorotetracycline according to this invention | 60 |
| The reaction product between 1-amino-2-ethane thiosulfonic acid, formaldehyde and chlorotetracycline according to this invention | 45 |

The acute and chronic toxicities are lower not only in comparison with the starting antibotics (for example chlorotetracycline hydrochloride), but also in comparison with already known derivatives of such antibiotics.

TABLE 2.—ACUTE TOXICITY ($LD_{50}$)

Intravenous administration to Swiss white rats. All $LD_{50}$ are expressed as chlorotetracycline hydrochloride in order to allow a direct comparison.

| Product | $ED_{50}$ in mg./kg. |
|---|---|
| Chlorotetracycline hydrochloride | 91.5 |
| N - methylol - chlorotetracycline (German Pat. 1,196,648) | 117 |
| The reaction product between 1-amino-2-ethane sulfinic acid, formaldehyde and chlorotetracycline according to this invention | 127 |
| The reaction product between ethanolaminomethane sulfonic acid, formaldeide and chlorotetracycline according to this invention | 142 |
| The reaction product between 1-amino-2-ethane thiosulfonic acid, formaldehyde and chlorotetracycline according to this invention | 138 |

TABLE 3.—CHRONICAL TOXICITY

Intraperitoneal administration to Swiss white rats. Dose: 150 mg. per kg. body wt., daily. Doses are all expressed as chlorotetracycline hydrochloride.

| Product | Mortality (percent) after— 10 days | 15 days |
|---|---|---|
| Chlorotetracycline hydrochloride | 20 | 50 |
| The reaction product between ethanolaminomethane sulfonic acid, formaldehyde and chlorotetracycline according to this invention | 0 | 10 |
| The reaction product between 1-amino-2-ethane sulfinic acid, formaldehyde and chlorotetracycline according to this invention | 0 | 5 |
| The reaction product between 1-amino-2-ethane thiosulfonic acid, formaldehyde and chlorotetracycline according to this invention | 5 | 20 |

TABLE 4.—CHRONICAL TOXICITY

Administration by mouth to Swiss white rats. Dose: 500 mg. per kg. daily. Doses are expressed as chlorotetracycline hydrochloride.

| Product | Average weight (in g.) of animals after the following days— | | | | | |
|---|---|---|---|---|---|---|
| | 10 | 20 | 30 | 40 | 50 | 60 |
| Chlorotetracycline hydrochloride | 21 | 21.7 | 22 | 23.5 | 24.9 | 25.4 |
| The reaction product between 1-amino-2-ethane sulfinic acid, formaldehyde and chlorotetracycline according to this invention | 21 | 21.9 | 23.1 | 25.1 | 26.5 | 27.6 |
| The reaction product between 1-amino-2-ethane thiosulfonic acid, formaldehyde and chlorotetracycline according to this invention | 22.5 | 25.8 | 28.1 | 30 | 31.9 | 31.1 |
| Untreated control animals | 20.5 | 21.7 | 22.5 | 23.2 | 23.8 | 24 |

To these evident and remarkable advantages, representing per se already a progress in the present state of therapeutics, there are added other ones which are all surprising and novel for the antibiotics of the tetracycline group.

It is known that among the chief inconveniencies due to tetracyclines there is a liver toxicity due to a fatty degeneration of liver, particularly with chlorotetracycline and 5-hydroxytetracycline, and this toxicity may lead in certain cases to death. (American J. Obstetr. Gynecol. 95, 523—1966; New England J. of Med. Vol. 269, 99—1963; A.M.A. Archives of Internal Medicine Vol. 88, 271—1951).

To date, no tetracycline derivative has such a severe side effect; on the contrary with the products of this invention we have obtained surprising effects, with a considerable reduction of the fat percent in liver.

The following data are a demonstration of the above.

TABLE 5.—PERCENT OF FAT IN LIVER

Dose of 100 mg. per kg. intravenously to Wistar white rats. The percentages represent the increase of fat in comparison with untreated control animals. Doses are expressed as chlorotetracycline hydrochloride.

| Product | Percent of fat in liver 48 and 72 hours after the drug administration | |
|---|---|---|
| | 48 hours | 72 hours |
| Chlorotetracycline hydrochloride | 95 | 60 |
| The reaction product between 1-amino-2-ethane sulfinic acid, formaldehyde and chlorotetracycline according to this invention | 69.5 | 12.5 |
| The reaction product between 1-amino-2-ethane sulfonic acid, formaldehyde and chlorotetracycline according to this invention | 51 | 26.5 |

These novel products are prepared by a process which consists schematically of the condensation reaction of the starting substances which have been discussed above, that is a tetracycline, formaldehyde and an amine containing a sulfurated acid function.

The condensation can be effected in various solvents which do not take part in the reaction, such as methanol, isopropyl alcohol, dimethylformamide, 2-methoxyethanol, and tetrahydrofuran, both alone as well as in mixture with other solvents.

The molar ratios of the reacting substances can be varied within fairly wide limits; however the preferred reaction ratios amine:formaldehyde:tetracycline range from 1:1:1 to 1:3:2. In such a range, for every product, the optimum of the reaction may be found.

Formaldehyde can be employed in aqueous solution, in methanol solution or as a polymer; however the preferred form is the aqueous solution, which is also the cheapest one.

Tetracycline can be utilized both as an amphoteric base, as well as under the form of an addition salt with an acid (e.g. the hydrochloride salt), or under the form of an alkaline salt (e.g. sodium salt).

The reaction temperature can range from 20° C. to 50° C.; an optimum temperature is comprised between 25° C. and 35° C.

According to the product type and the reaction conditions the product can separate spontaneously during the course of the reaction, or it can be isolated by precipitating it with solvents in which it is not miscible, or by concentrating the reaction mixture by means of a solvent distillation.

The following illustrative examples serve to make clear the method and to demonstrate how one can vary the conditions within the previously stated limits: It should be clear that these are simply examples and that routine variations fall within. The examples, therefore, do not constitute any limitation to the invention.

EXAMPLE 1

0.8 g. (0.02 mole) NaOH and 2.22 g. (0.02 mole) aminomethane sulfonic acid are dissolved in 80 ml. of a 1:1 mixture of methanol and 2-methoxyethanol; successively, 4.5 ml. (0.06 mole) aqueous 40% formaldehyde and, after 15 minutes, 17.76 g. tetracycline (the base) dissolved in 80 ml. 2-methoxyethanol, are added.

After some minutes, precipitation begins. Stirring is continued still for 30 minutes at 30° C.; then, the product is collected, washed with methyl alcohol and dried at 40° C. under reduced pressure. It is a light yellow powder, very soluble in water; and an aqueous 5% solution has a pH of 6.9–7.1.

*Analysis.*—Calcd. for $C_{46}H_{52}O_{19}N_5SNa$ (percent): (dried over $P_2O_5$ under high vacuum): C, 53.43; H, 5.07; N, 6.77; S, 3.10; Na, 2.22. Found (percent): C, 53.34; H, 5.22; N, 6.88; S, 3.24; Na, 2.01.

EXAMPLE 2

1.11 g. aminomethane sulfonic acid is dissolved in 80 ml. methanol containing 0.5 g. NaOH; there is added 10 g. chlorotetracycline (the base) dissolved in methanol (30 ml.) and dimethylformamide (50 ml.). The mixture is filtered in order to avoid possible insoluble residues and there is added 1.5 ml. aqueous 40% formaldehyde, and the mixture is left then to react for 60 minutes at room temperature. After some minutes the product precipitates and it is collected, washed with methanol and dried at 40° C. under vacuum.

*Analysis.*—Calcd. for $C_{46}H_{50}Cl_2N_5O_{19}SNa$ (percent): S, 2.90. Found (percent): S, 2.8.

EXAMPLE 3

1.25 g. (0.01 mole) methylaminomethane sulfonic acid and 0.4 g. NaOH are dissolved in 60 ml. methanol. To the solution there is added 2.25 ml. (0.03 mole) aqueous 40% formaldehyde. The mixture is left to react for 5 minutes and then there is added 9 g. tetracycline (the base) dissolved in 60 ml. 2-methoxy ethanol and 40 ml. isopropanol. The mixture is kept under stirring at room temperature for 30 minutes and during this time the separation of the product takes place, which is collected and washed with isopropanol.

*Analysis.*—Calcd. for $C_{47}H_{54}O_{19}N_5SNa$ (percent): S, 3.06. Found (percent): S, 2.85.

EXAMPLE 4

0.45 g. NaOH and 1.25 g. methylaminomethane sulfonic acid are dissolved in 110 ml. methanol. After adding 1.5 ml. aqueous 40% formaldehyde the mixture is left under stirring for 10 minutes and then there is added 10 g. chlorotetracycline dissolved in a mixture of 60 ml. dimethylformamide and 90 ml. isopropanol. After some minutes the product precipitates slowly. It is left still for 30 minutes to reach and then it is filtered and washed with isopropyl alcohol.

*Analysis.*—Calcd. for $C_{47}H_{52}O_{19}N_5Cl_2SNa$ (percent) S, 2.87. Found (percent): 2.95.

EXAMPLE 5

After having dissolved 0.4 g. NaOH and 1.4 g. ethylaminomethane sulfonic acid in 40 ml. methanol, to the solution there is added successively 1.5 ml. aqueous 40% formaldehyde and, after 5 minutes, 9.6 g. chlorotetracycline dissolved in a mixture consisting of isopropyl alcohol (80 ml.), methanol (30 ml.) and dimethylformamide (50 ml.). The mixture is left to react at room temperature for 30 minutes and then the separated product is collected.

*Analysis.*—Calcd. for $C_{48}H_{54}O_{19}N_5Cl_2SNa$ (percent): S, 2.83. Found (percent): S, 2.7 and 3.1.

EXAMPLE 6

2.25 ml. aqueous 40% formaldehyde is added to a solution of 0.01 mole sodium salt of n-butylaminomethane sulfonic acid in 80 ml. methanol. After 5 minutes there is added a solution of 9.6 g. chlorotetracycline in a mixture of 100 ml. isopropanol and 30 ml. dimethylformamide.

The mixture is left under stirring at room temperature for 30 minutes and then the separated product is filtered out, washed with isopropyl alcohol and dried at 40° C. under vacuum.

*Analysis.*—Calcd. for S content (percent): 2.76. Found (percent): 3.

EXAMPLE 7

0.8 g. NaOH and 3.1 g. β-hydroxyethylaminomethane sulfonic acid are dissolved in 120 ml. methanol. There is added 4.5 ml. aqueous 40% formaldehyde and the mixture is left for 15 minutes at room temperature and then filtered. 19.3 g. chlorotetracycline, dissolved in 60 ml. dimethylformamide and 80 ml. isopropanol, is added to the filtrate, and allowed to react for 30 minutes at 25–30° C.

The reaction product, which precipitates spontaneously, is then washed with isopropanol and dried under vacuum at 40° C.

The product is very water soluble, an aqueous 5% solution has a pH of 7.2–7.4.

An analytical sample, dried over $P_2O_5$ at 70° C. under high vacuum gave the following results for

$C_{48}H_{54}O_{20}N_5Cl_2SNa$

Calc'd for $C_{48}H_{54}O_{20}N_5Cl_2SNa$ (percent): N, 6.10; Cl, 6.18; S, 2.79; Na, 2.00. Found (percent): N, 6.23; Cl, 6.23; S, 2.74; Na, 2.02.

EXAMPLE 8

0.8 g. (0.02 mole) NaOH, 2.18 g. (0.02 mole) 1-amino-2-ethane sulfinic acid and 3 ml. (0.04 mole) aqueous 40% formaldehyde are dissolved in 160 ml. methanol at room temperature. The mixture is left for 5 minutes at room temperature and then there is added 17.86 g. tetracycline dissolved in 80 ml. 2-methoxyethanol. It is stirred for 30 minutes at 30° C. and then the precipitated product is filtered out, washed with methanol and dried under vacuum at 40° C.

The product is water soluble and a 10% aqueous solution has a pH of 7.45. In 0.01 N NaOH, it shows absorption peaks at 270 and 382 mμ. The rotatory power is $[\alpha]^D_{20} = -200 \pm 5°$ (C=1 in water).

An analytical sample, dried under high vacuum over $P_2O_5$ at 50° for a few hours yields the following values for $C_{47}H_{54}O_{18}N_5SNa$:

Calc'd for $C_{47}H_{54}O_{18}N_5SNa$ (percent): C, 54.69; H, 5.27; N, 6.78; S, 3.10; Na, 2.22. Found (percent): C, 54.52; H, 5.19; N, 6.80; S, 2.93; Na, 2.01.

The antibacterial activity in vitro against *Sarcina lutea*, while using tetracycline hydrochloride as the standard, is 900–910γ/mg. (theoretical 934γ/mg.).

EXAMPLE 9

0.8 g. (0.02 mole) NaOH and 2.18 g. (0.02 mole) 1-amino-2-ethane sulfinic acid are dissolved in 150 ml. methanol. The solution is treated with 3 ml. aqueous 40% formaldehyde and the mixture is left for 5 minutes at room temperature. Then, there is added 19.2 g. chlorotetracycline (the base) dissolved in 80 ml. dimethylformamide and 60 ml. methanol, and the mixture is left to react for 30 minutes at 30° C. The product separates spontaneously and is collected, washed on the filter with methanol and dried under vacuum at 40° C. It is very water soluble and a 10% solution has a pH between 7.2 and 7.4. In 0.01 N NaOH it shows absorption peaks at 253 and 258 mμ. The rotatory power is $[\alpha]^D_{20°} = -195 \pm 5°$ (C=1 in water)

The infrared spectrum presents the 1526 cm.$^{-1}$ band of monosubstituted amide.

For the elemental analysis, the sample was dried under high vacuum over $P_2O_5$ at 50° for a few hours. The analysis of 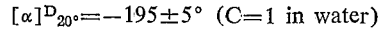 $C_{47}H_{52}O_{18}N_5Cl_2SNa$ showed:

Calc'd for $C_{47}H_{52}O_{18}N_5Cl_2SNa$ (percent): C, 51.27; H, 4.76; N, 6.36; Cl, 6.44; S, 2.91; Na, 2.08. Found (percent): C, 51.10; H, 4.94, 4.81; N, 6.52, 6.40; Cl, 6.32, 6.51; S, 2.83, 2.85; Na, 2.33, 1.90.

The antibacterial activity in vitro against *Sarcina lutea*, while using chlorotetracycline hydrochloride as the standard, is of 910–920γ/mg. (theoretical 927γ/mg.).

EXAMPLE 10

0.4 g. (0.01 mole) NaOH and 1.41 g. (0.01 mole) 1-amino-2-ethane thiosulfonic acid dissolved in 80 methanol, are treated with 1.5 ml. (0.02 mole) aqueous 40% formaldehyde and, after 5 minutes, with a solution of 9 g. tetracycline (the base) dissolved in 40 ml. 2-methoxyethanol. While leaving stirring at room temperature a yellow product separates which is filtered out after 30 minutes, washed with methanol and dried under vacuum.

*Analysis.*—Calc'd for $C_{47}H_{54}O_{18}N_5S_2Na$ (percent): C, 53.05; H, 5.11; N, 6.58; S, 6.02; Na, 2.16. Found (percent): C, 52.95; H, 5.20; N, 6.40; S, 5.83; Na, 2.11.

An aqueous 10% solution has a pH=7.45. In 0.01 N NaOH it shows absorption peaks at 270 and 382 m$\mu$. The rotatory power is $[\alpha]^D_{20°}=-220\pm5°$ (C=1 in water).

The antibacterial activity in vitro against *Sarcina lutea*, while using tetracycline hydrochloride as the standard, is 870–880$\gamma$/mg. (theoretical 909$\gamma$/mg.).

EXAMPLE 11

0.01 mole sodium 1-amino-2-ethane thiosulfonate is reacted for 5 minutes at room temperature with 1.5 ml. (0.02 mole) aqueous 40% formaldehyde in 80 ml. methanol; thereafter, there is added a solution of 10 g. chlorotetracycline (the base) in 40 ml. dimethylformamide and 30 ml. methanol. After some minutes the product precipitates and the reaction mass is held for a total of 30 minutes at 25–30° and then it is filtered. The product is washed with methanol and dried under vacuum.

*Analysis.*—Calc'd for $C_{47}H_{52}O_{18}N_5Cl_2S_2Na$ (percent): C, 49.82; H, 4.62; N, 6.18; Cl, 6.25; S, 5.66; Na, 2.03. Found (percent): C, 49.86; H, 4.81; N, 6.01; Cl, 6.11; S, 5.61; Na, 1.91.

An aqueous 10% solution has a pH=7.3 and a 20% solution, a pH=7.4. In 0.01 N NaOH, it shows absorption peaks at 253 and 285 m$\mu$. The rotatory power is $[\alpha]^D_{20°}=-210\pm5°$ (C=1 in water). The infrared spectrum presents the 6.55$\mu$ band of monosubstituted amide.

The antibacterical activity in vitro against *Sarcina lutea*, while using chlorotetracycline hydrochloride as standard, is 880–890$\gamma$/mg. (theoretical 900$\gamma$/mg.).

EXAMPLE 12

0.4 g. NaOH, 5.6 g. 5-hydroxytetracycline (the base) and 1.2 g. 1-amino-2-ethane sulfinic acid are dissolved in a mixture of 60 ml. methanol and 30 ml. 2-methoxyethanol. After all substances are dissolved, the mixture is filtered and 1.5 ml. aqueous 40% formaldehyde is added to the filtrate and after some minutes the reaction product separates. The mixture is stirred for 30 minutes at room temperature, then the product is collected, washed with methanol and dried at 40° C. under reduced pressure.

*Analysis.*—Calc'd for $C_{47}H_{54}O_{20}N_5SNa$ (percent): S, 3.01. Found (percent): S, 3.0 and 2.75.

EXAMPLE 13

To a solution of 0.01 mole sodium 1-amino-2-ethane sulfinate in 40 ml. methanol there are added 0.85 ml. aqueous 40% formaldehyde and, after five minutes, a solution of 6-dimethyl-7-chlorotetracycline prepared by suspending 5 g. dimethyl-chlorotetracycline hydrochloride in 20 ml. dimethyl formamide. The mixture is neutralized with 0.4 g. NaOH in 25 ml. methanol and the mixture is left to react at 25° for 30 minutes after which the product is filtered out. It is dried under vacuum at 50° C.

*Analysis.*—Calc'd for $C_{47}H_{48}O_{18}N_5Cl_2SNa$ (percent): S, 2.98. Found (percent): S, 2.75.

EXAMPLE 14

0.8 g. NaOH and 1.41 g. 1-amino-ethane thiosulfonic acid are dissolved in 40 ml. methanol. Then, there is added 5.3 g. 5-hydroxytetracycline hydrochloride in 30 ml. 2-methoxyethanol and, after the substance is dissolved, the mixture is filtered to eliminate possible impurities. Then the filtrate is diluted with 15 ml. isopropanol and treated with 0.85 ml. aqueous 40% formaldehyde. It is stirred for 60 minutes at room temperature. After some minutes the product begins to precipitate. It is collected, washed with isopropanol and dried under a reduced pressure at 50° C.

*Analysis.*—Calc'd for $C_{47}H_{54}O_{20}N_5S_2Na$ (percent): S, 5.85. Found (percent): S, 5.95.

EXAMPLE 15

A solution of 0.01 mole sodium 1-amino-2-ethane thiosulfonate in 40 ml. methanol is reacted for 5 minutes at room temperature with 0.85 ml. 40% aqueous formaldehyde and then is treated with a solution of 0.01 mole 7-chloro-6-demethyltetracycline dissolved in 20 ml. dimethylformamide and 25 ml. methanol. After some minutes the reaction product precipitates. The reaction mass is stirred at room temperature for a total of 30 minutes, then it is filtered and the product is washed with methanol.

After drying over $P_2O_5$ at 50° under vacuum, the product yields the following data on analysing for $C_{45}H_{48}O_{18}N_5Cl_2S_2Na$:

Calc'd for $C_{45}H_{48}O_{18}N_5Cl_2S_2Na$ (percent): S, 5.80. Found (percent): S, 6.

EXAMPLE 16

A solution of 0.4 g. NaOH, 1.1 g. 1-amino-2-ethane sulfinic acid and 0.85 ml. aqueous 40% formaldehyde in 25 ml. methanol is provided. To this solution there is added a second one prepared from 4.8 g. tetracycline hydrochloride suspended in 20 ml. 2-methoxyethanol and neutralized with 0.4 g. NaOH in 15 ml. methanol.

The resulting solution is diluted with 20 ml. isopropyl alcohol and left to react at room temperature for 30 minutes; the separated product is filtered out, washed with methanol and dried under vacuum at 40° C.

Calc'd for S content (percent): 3.10. Found (percent): 2.95.

EXAMPLE 17

0.4 g. (0.01 mole) NaOH, 1.1 g. (0.01 mole) 1-amino-2-ethane sulfinic acid and 1.5 ml. (0.02 mole) aqueous 40% formaldehyde are dissolved in 50 ml. methanol. A separate suspension of 10.3 g. (0.02 mole) chlorotetracycline hydrochloride in a mixture of 30 ml. methanol and 40 ml. dimethylformamide is neutralized with 0.8 g. NaOH dissolved in methanol (30 ml.) and isopropanol (30 ml.). The resulting solution is filtered and is added to the solution containing the aminoacid, and then it is left to react for 30 minutes at 25° C. The precipitated product is collected, washed with isopropyl alcohol and dried at 40° C. under a reduced pressure.

The product is identical to that of Example 9. Various analyzed samples showed: S=2.7; 2.65; 2.8.

EXAMPLE 18

To a solution containing 1.5 ml. (0.02 mole) aqueous 40% formaldehyde and 0.01 mole sodium 1-amino-2-ethane sulfonate in 60 ml. methanol there is added a solution prepared by neutralizing 10.5 g. chlorotetracycline hydrochloride suspended in 40 ml. dimethylformamide, with 0.8 g. NaOH in 50 ml. methanol. Then, it is left under stirring for 30 minutes, the precipitated product is filtered out, and dried at 40° C. under vacuum.

Calc'd for S content (percent): 5.66. Found (percent): 5.3.

The product is the same as that of Example 11.

EXAMPLE 19

1.6 g. NaOH, 6.2 g. ethanolaminomethane sulfonic acid and 3.4 ml. aqueous 40% formaldehyde are dissolved in 160 ml. methanol.

After 5 minutes there is added 20 g. chlorotetracycline dissolved in 80 ml. dimethylformamide and 60 ml. methanol. The resulting solution is held for 1 hour at 35° C., cooled, filtered to eliminate possible undissolved impurities, and diluted with 200 ml. isopropyl ether. The precipitated product is washed on the filter with isopropyl ether and dried under vacuum at 40° C.

Various analysed samples gave the following results:
Calc'd for S content (percent): 2.79. Found (percent): S, 3.1; 3; 3.1.

We claim:
1. Condensation products of tetracyclines consisting of the reaction products of a tetracycline taken from the group consisting of tetracycline, 7-chlorotetracycline, 5-hydroxytetracycline, and 7-chloro-6-dimethyltetracycline; formaldehyde and an amine containing a sulfuric acid radical and having the formula

$$R-NH-Z-SO_2X$$

wherein R is taken from the group consisting of hydrogen, alkyl and hydroxyalkyl radicals containing up to 4 carbon atoms, Z is taken from the group consisting of $CH_2$ and $CH_2-CH_2$, and X is taken from the group consisting of OH when Z is $CH_2$, H when Z is $CH_2-CH_2$ and SH when Z is $CH_2-CH_2$; the molar ratio of said amine:formaldehyde:tetracycline ranging between 1:1:1 and 1:3:2; said reaction being carried out at a temperature between 20 and 50° C.; the molar ratio of amine to tetracycline in said products being 1:2.

References Cited

UNITED STATES PATENTS 3,272,817   9/1966   Gordon et al.

OTHER REFERENCES

Gottstein et al.: Carboxamido Derivatives of the Tetracyclines. J.A.C.S. 81, 1198, 1959.

ALEX MAZEL, Primary Examiner

A. M. T. TIGHE, Assistant Examiner

U.S. Cl. X.R.

424—227; 260—513, 583, 584